June 21, 1966

I. E. KAMRUD 3,256,991

COMBINATION HARD AND SOFT WATER SYSTEM

Filed May 28, 1963

Irvin E. Kamrud
INVENTOR.

BY *Clarence A. O'Brien
and Harvey B. Jacobson*
Attorneys

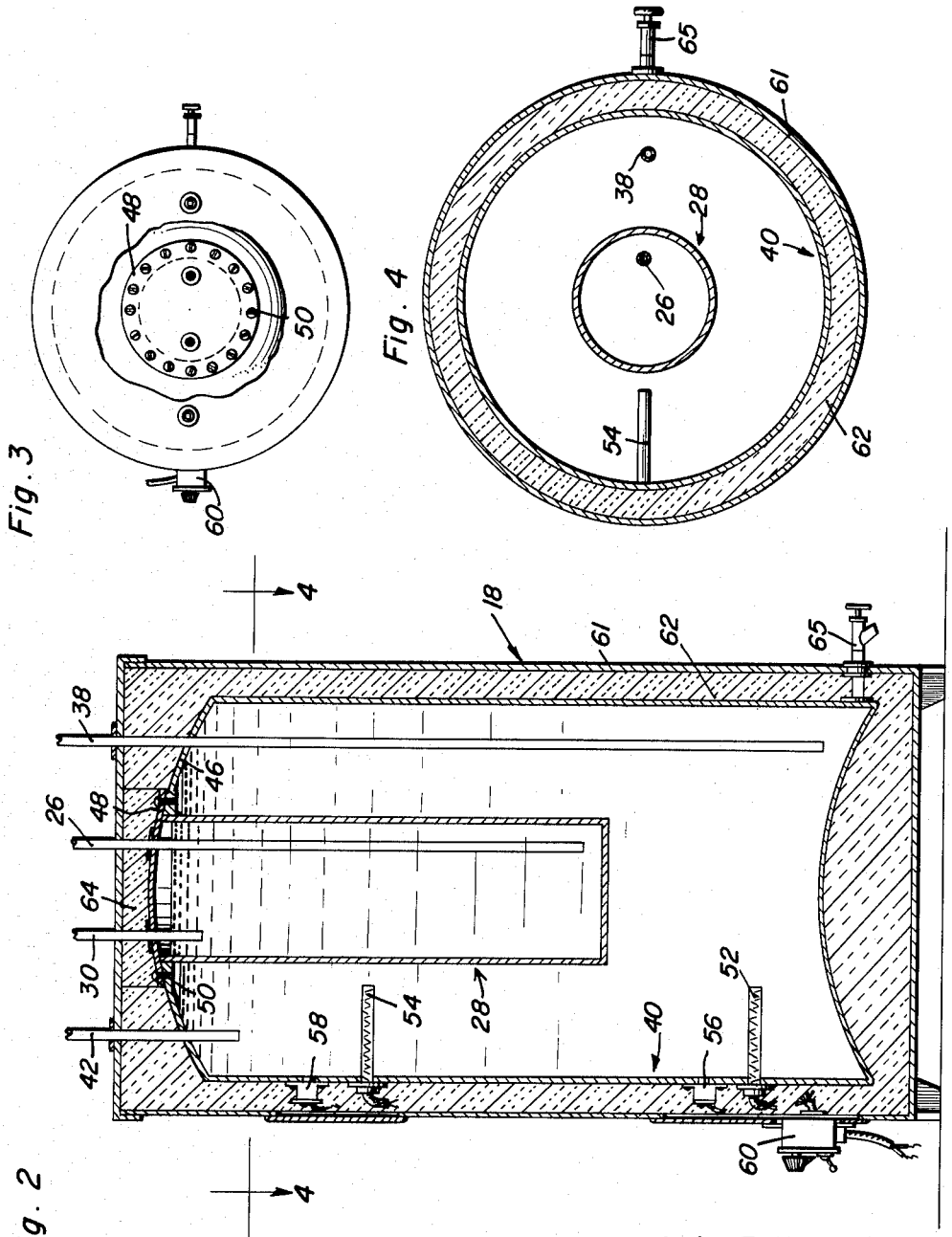

United States Patent Office 3,256,991
Patented June 21, 1966

3,256,991
COMBINATION HARD AND SOFT WATER SYSTEM
Irvin E. Kamrud, Rte. 1, Box 83, Bottineau, N. Dak.
Filed May 28, 1963, Ser. No. 283,754
4 Claims. (Cl. 210—149)

The present invention generally relates to new and useful improvements in water supply systems, and is more particularly directed toward a novel arrangement, including a unique combination or double water heater, for supplying, from a single hard water source, both hot and cold hard or soft water.

While soft water is generally preferred for the majority of household tasks, thus requiring the incorporation of a water softener within the water supply system, in those areas having hard water, hard water is generally more desirable for cooking purposes. Accordingly, it is a primary object of the instant invention to provide a water supply system wherein one has, instantly available by the turning of a tap or faucet, both hard and soft water, either hot or cold.

Another significant object in conjunction with the above object is to provide a novel combination water heater capable of separately heating a supply of both hard and soft water.

Further, it is an object of the instant invention that the above water heater be relatively inexpensive and comparatively simple in structure with the main or larger tank being usable individually if so desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational cross-sectional view through the water heater utilized in the system of FIGURE 1;

FIGURE 3 is a top plan view of the water heater of FIGURE 2 with portions broken away for purposes of illustration;

FIGURE 4 is a cross-sectional view taken substantially on a plane passing along line 4—4 in FIGURE 2.

Figure 1:
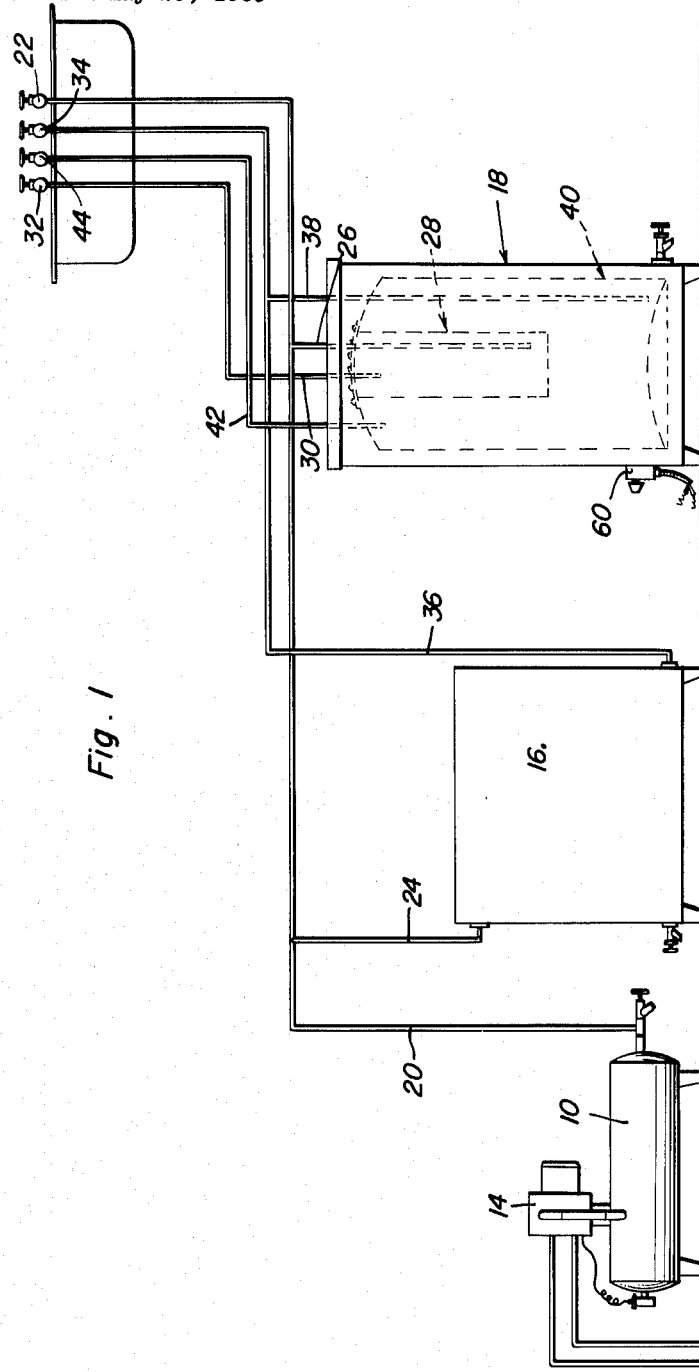
FIGURE 1 is a schematic view illustrating the water system of the instant invention.
Figure 5:
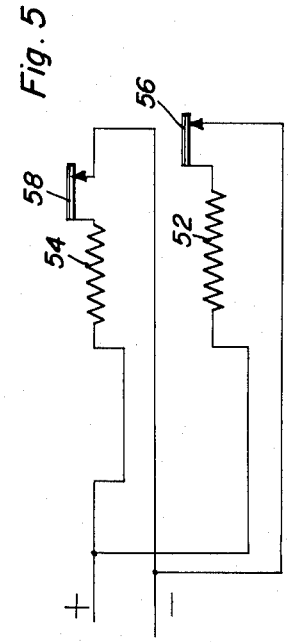
FIGURE 5 is a diagrammatic illustration of the thermostatically controlled upper and lower heating elements.

With particular reference to FIGURE 1, it will be noted that the combination hard and soft water system of the instant invention, utilized in conjunction with a hard water supply represented by the storage tank 10 into which the water is introduced from a well or other source 12 by suitable pump means 14, consists basically of a series of water pipes ultimately leading to four water taps provided in conjunction with a sink, for example a kitchen sink, a water softener 16 of any suitable commercially available type, and a unique combination water heater 18.

A first elongated water service line 20 extends in fluid transmitting communication from the hard water supply 10 to a first water tap 22, this service line 20 having a first branch line 24 introducing a portion of the flow into the water softener 16, and a second branch line 26 introducing a portion of the flow into the smaller inner water tank 28. The hard water is subsequently delivered from the smaller hot water tank 28 through the delivery line 30 to a second tap 32. The soft water, resulting from the action of the water softener 16, is delivered to a third water tap 34 through the delivery line 36, this delivery line 36 having a branch line 38 introducing a portion of the soft water flow into the outer larger water heater tank 40 which also has a water delivery line 42 extending therefrom into communication with the fourth water tap 44 for the dispensing of hot soft water.

As will be appreciated, the system, as described supra, while relatively simple, is unique in that it provides for the immediate availability of hard or soft water, either hot or cold as may be desired by the individual user.

Particular attention is now directed toward FIGURES 2–5 wherein the novel combination heater 18 has been illustrated in detail. This water heater 18, as indicated supra, consists of an outer large water tank 40 and an inner substantially smaller water tank 28, the larger tank 40 having the branch line 38 and delivery line 42 communicated therewith for the introduction of cold soft water and removal of hot soft water, and the smaller tank 28 having the branch line 26 and delivery line 30 in communication therewith for the introduction of cold hard water and the removal of hot hard water, both of these delivery lines 30 and 42 communicating with the hot water taps 44 and 32.

It is contemplated that the smaller inner tank 28 be suspended centrally from the top wall 46, this top wall 46 having a central aperture therethrough through which the smaller tank 28 can be lowered, the smaller tank having a radially projecting outwardly extending flange 48 about the upper end thereof, this flange 48 resting upon that portion of the top 46 surrounding the central opening and being releasably secured thereto as by bolts 50. It will be recognized that by so combining the small tank 28 and large tank 40, the large tank 40 can be sold and used as a conventional water heater without the smaller tank 28, the top wall opening in the tank 40 being sealed by any suitable cover bolted in the same manner as the small tank flange 48, the addition of the second or smaller tank 28 being possible, as desired, at any future time. While the manner in which the smaller tank 28 is to be preferably mounted within the larger tank 40 has been described in detail, it will be appreciated that the present invention is not specifically limited to this manner of mounting the smaller tank 28 within the larger tank 40, any suitable manner of effecting this mounting being considered within the scope of the invention.

The heating of both the hard and soft water within the tanks 28 and 40 is effected by means of upper and lower heating elements 52 and 54, each individually controlled by thermostats 56 and 58, suitable external controls being provided as indicated by reference numerals 60. These heating elements 52 and 54, as will be appreciated from FIGURE 2, are both located within the larger tank 40, the heating of the hard water within the smaller tank 28 being effected by a transfer of the heat from the heated soft water within the tank 40 surrounding the smaller tank 28. The upper thermostatically controlled heating element 54 is of particular significance because of its proximity to the smaller tank 28 thus insuring the temperature of the soft water directly surrounding and heating the smaller tank 28 and hard water therein is maintained at the desired high temperature.

The larger outer tank 40, in order to assist in maintaining the temperature of the water therein, is surrounded by an outer shell 61, the shell 61 being spaced slightly from the tank 40 with the intervening space substantially filled with a suitable insulation 62, a portion of this insulation, indicated by reference numeral 64, in line with the aperture through the top of the tank 40 being readily removable so as to allow for the introduction or removal of the smaller tank 28 as might be desired. Incidentally, with reference to FIGURE 2, it will be noted that a conventional drain 65 is provided in communication with the lower end of the outer larger tank 40.

Accordingly, it should now be appreciated that, in addition to setting forth the novel water supply system wherein both hot and cold hard and soft water can be supplied at the user's convenience, the instant invention also defines a novel combination water heater wherein both hard and soft water can be individually and separately heated for selective dispensing to a pair of hot water taps. In regard to this combination water heater it should be noted that a particularly significant feature is the removable nature of the smaller inner tank relative to the larger outer tank, this enabling the sale and use of the outer tank without the inner tank with the later addition of the smaller tank to the system being possible, the construction of the outer tank so as to allow for the introduction of the smaller tank requiring no appreciable increase in the cost of the tank.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a water supply system supplied from a hard water source, a water softener, water heating means, a service line extending from the hard water source to a first water tap, a first branch line communicating the service line with the water softener, a first delivery line extending from the water softener to a second water tap, a second branch line communicating the first delivery line with the heating means, a second delivery line extending from the heating means to a third water tap, a third branch line communicating the service line with the heating means, and a third delivery line extending from the heating means to a fourth water tap.

2. The system of claim 1 wherein said water heating means consists of two non-communicating tanks, the second branch line and second delivery line communicating with one tank and the third branch line and third delivery line communicating with the other tank.

3. The system of claim 2 wherein said other tank is smaller than and positioned within said one tank.

4. The system of claim 3 including a pair of individual thermostatically controlled heating elements located within the larger tank, at least one of said elements being in the vicinity of the smaller tank.

References Cited by the Examiner
UNITED STATES PATENTS

| | | | |
|---|---|---|---|
| 1,028,555 | 6/1912 | Donald et al. | 122—33 X |
| 1,698,342 | 1/1929 | McGill. | |
| 1,863,273 | 6/1932 | Hofferbert. | |
| 2,981,415 | 4/1961 | White | 210—181 X |

REUBEN FRIEDMAN, *Primary Examiner.*

D. M. RIESS, *Assistant Examiner.*